(12) United States Patent
Mizutani et al.

(10) Patent No.: US 12,344,809 B2
(45) Date of Patent: Jul. 1, 2025

(54) WORKING FLUID, FREEZER, AND FREEZER OIL

(71) Applicant: ENEOS Corporation, Tokyo (JP)

(72) Inventors: Yuya Mizutani, Tokyo (JP); Kentaro Yamaguchi, Tokyo (JP); Motoya Okazaki, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 10 days.

(21) Appl. No.: 18/038,540

(22) PCT Filed: Nov. 26, 2021

(86) PCT No.: PCT/JP2021/043418
§ 371 (c)(1),
(2) Date: May 24, 2023

(87) PCT Pub. No.: WO2022/114137
PCT Pub. Date: Jun. 2, 2022

(65) Prior Publication Data
US 2024/0018437 A1 Jan. 18, 2024

(30) Foreign Application Priority Data
Nov. 30, 2020 (JP) ................................. 2020-198763

(51) Int. Cl.
*C10M 105/46* (2006.01)
*C09K 5/04* (2006.01)
(Continued)

(52) U.S. Cl.
CPC ........... *C10M 105/46* (2013.01); *C09K 5/042* (2013.01); *C10M 105/38* (2013.01);
(Continued)

(58) Field of Classification Search
CPC ............ C10N 2020/00; C10N 2040/02; C10N 2020/02; C10N 2030/00; C10N 2030/06;
(Continued)

(56) References Cited

U.S. PATENT DOCUMENTS

2011/0011123 A1* 1/2011 Matsuura .............. F04B 39/023
62/468
2015/0344760 A1* 12/2015 Saito ...................... C09K 5/045
252/68

(Continued)

FOREIGN PATENT DOCUMENTS

JP 2002-235664 A 8/2002
JP 2005-325151 A 11/2005
(Continued)

OTHER PUBLICATIONS

International Search Report Issued in International Patent Application No. PCT/JP2021/043418, dated Feb. 1, 2022, and English translation thereof.
(Continued)

*Primary Examiner* — Vishal V Vasisth
(74) *Attorney, Agent, or Firm* — GREENBLUM & BERNSTEIN, P.L.C.

(57) ABSTRACT

A working fluid filled in a refrigerant circulation system comprising a compressor, a condenser, an expansion mechanism, an evaporator, and an accumulator, the working fluid comprising: a refrigerant; and a refrigerating machine oil, wherein the refrigerant comprises a hydrocarbon refrigerant having 2 to 4 carbon atoms, the refrigerating machine oil has a mixed aniline point of 20° C. or higher and 50° C. or lower and a viscosity index of 110 or more, an amount of the refrigerant dissolved in the working fluid is 40% by mass or less under conditions of a temperature of 80° C. and an absolute pressure of 2.8 MPa, and the refrigerating machine
(Continued)

oil has a kinematic viscosity at −10° C. of 200 mm²/s or more and 3000 mm²/s or less.

8 Claims, 1 Drawing Sheet

(51) Int. Cl.
| | | |
|---|---|---|
| *C10M 105/38* | (2006.01) | |
| *C10M 105/40* | (2006.01) | |
| *F25B 1/00* | (2006.01) | |
| *F25B 43/02* | (2006.01) | |
| *C10N 30/02* | (2006.01) | |
| *C10N 30/06* | (2006.01) | |
| *C10N 40/30* | (2006.01) | |

(52) U.S. Cl.
CPC ............ *C10M 105/40* (2013.01); *F25B 1/00* (2013.01); *F25B 43/02* (2013.01); *C10M 2207/2835* (2013.01); *C10M 2207/2895* (2013.01); *C10M 2207/3045* (2013.01); *C10N 2030/02* (2013.01); *C10N 2030/06* (2013.01); *C10N 2040/30* (2013.01)

(58) Field of Classification Search
CPC ............ C10N 2040/30; C10N 2030/02; C10N 2020/103; C09K 5/042; C10M 171/008; C10M 105/38; C10M 105/40; C10M 105/46; C10M 2207/2895; C10M 2207/2875; C10M 2207/301; C10M 2207/289; C10M 2207/2835; C10M 2207/3045; F25B 43/02; F25B 1/00

See application file for complete search history.

(56) References Cited

U.S. PATENT DOCUMENTS

| | | |
|---|---|---|
| 2016/0289523 A1 | 10/2016 | Okido et al. |
| 2017/0089616 A1 | 3/2017 | Yamashita |
| 2020/0010777 A1* | 1/2020 | Fukushima ............ C09K 5/044 |
| 2020/0354645 A1 | 11/2020 | Shono et al. |
| 2020/0377777 A1 | 12/2020 | Ohkubo et al. |
| 2022/0380648 A1 | 12/2022 | Kumakura et al. |

FOREIGN PATENT DOCUMENTS

| | | |
|---|---|---|
| JP | 2008-138135 A | 6/2008 |
| JP | 2010-121927 A | 6/2010 |
| JP | 2011-43276 A | 3/2011 |
| WO | 2015/140885 A1 | 9/2015 |
| WO | 2019/156126 A1 | 8/2019 |
| WO | 2020/017522 A1 | 1/2020 |

OTHER PUBLICATIONS

English translation of International Preliminary Report on Patentability and Written Opinion in International Patent Application No. PCT/JP2021/043418, dated Jun. 15, 2023.

* cited by examiner

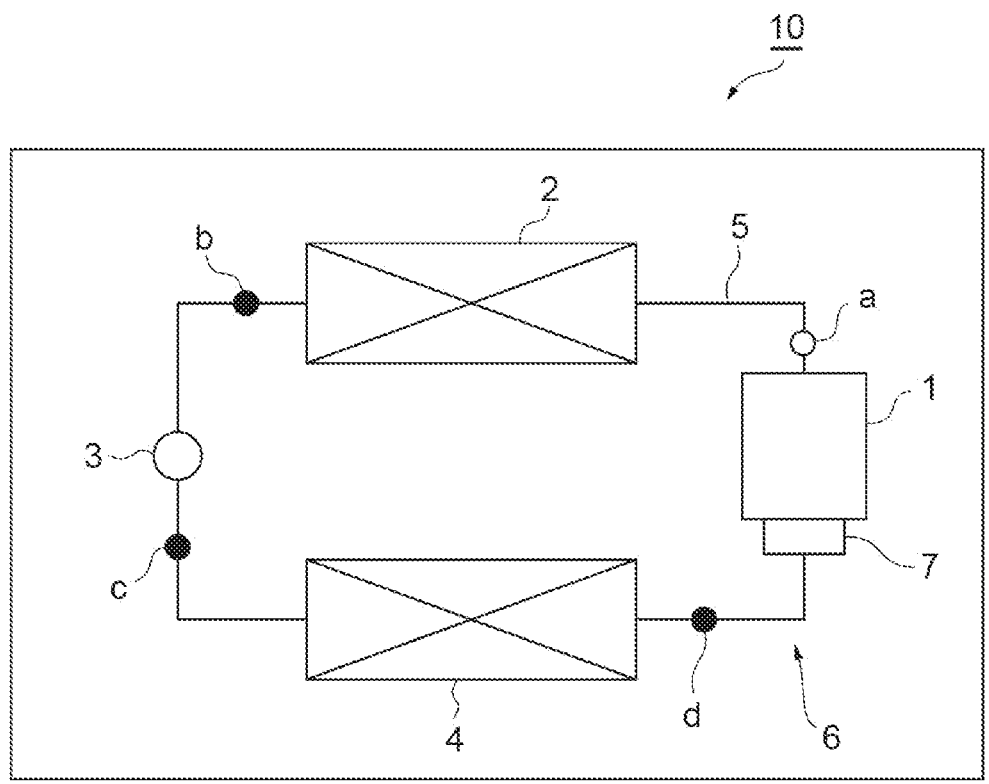

WORKING FLUID, FREEZER, AND FREEZER OIL

This application is a 371 of PCT/JP2021/043418 filed Nov. 26, 2021.

TECHNICAL FIELD

The present invention relates to a working fluid, a refrigerating machine and a refrigerating machine oil.

BACKGROUND ART

A refrigerating machine contains a refrigerant circulation system containing a compressor, a condenser, an expansion mechanism, an evaporator and an accumulator. In the refrigerant circulation system, a phenomenon in which heat is taken from the surroundings when a liquid is vaporized is used, and a cycle containing compression and temperature increase of the vaporized refrigerant in a compressor, liquefaction of the refrigerant by heat radiation condensation in a condenser, decompression expansion in an expansion mechanism, and vaporization of the refrigerant in an evaporator is repeated. In addition, the accumulator is a device that temporarily accumulates the liquid refrigerant returning to the compressor from the evaporator of the system to prevent or alleviate the suction of the liquid refrigerant in the compressor. It is desirable that the refrigerant circulation system is provided with an accumulator in order to prevent and alleviate insufficient supply of the refrigerating machine oil due to sudden dilution of the refrigerating machine oil in the compressor or lowering of the oil level, or damage to sliding parts or the like due to occurrence of liquid compression.

As a refrigerant used in a recent refrigerating machine, replacement of HFC refrigerants such as R134a and R410A with R32 that is an HFC refrigerant having a lower GWP, HFO refrigerants such as R1234yf having a further lower GWP, mixed refrigerants thereof, or natural refrigerants such as hydrocarbons and carbon dioxide has been studied.

When a hydrocarbon refrigerant such as 8290 or R600a is used among these refrigerants, use of a hydrocarbon-based refrigerating machine oil such as a mineral oil or an alkylbenzene, an ether-based refrigerating machine oil such as a polyalkylene glycol or a polyvinyl ether, and an ester-based refrigerating machine oil such as a monoester, a diester, or a polyolester has been studied. It is known that these refrigerating machine oils have good compatibility with refrigerants such as R290 and R600a, and when the refrigerants are dissolved, the kinematic viscosity (refrigerant dissolved viscosity) thereof is significantly reduced, which may cause problems such as poor lubricity seizure, and an increase in wear amount in the refrigerating machine (for example, Patent Document 1). Such a decrease in refrigerant dissolved viscosity is likely to occur under high temperature and high pressure conditions (for example, a high temperature of about 80° C. and a high pressure of about 2.8 MPa).

CITATION LIST

Patent Document

[Patent Document 1] Japanese Patent Application Publication No. 2002-235664

SUMMARY OF INVENTION

Technical Problem

An object of one aspect of the present invention is to maintain a refrigerant dissolved viscosity under high temperature and high pressure conditions.

Solution to Problem

One aspect of the present invention is a working fluid filled in a refrigerant circulation system comprising a compressor, a condenser, an expansion mechanism, an evaporator, and an accumulator, the working fluid comprising: a refrigerant; and a refrigerating machine oil, wherein the refrigerant comprises a hydrocarbon refrigerant having 2 to 4 carbon atoms, the refrigerating machine oil has a mixed aniline point of 20° C. or higher and 50° C. or lower and a viscosity index of 110 or more, an amount of the refrigerant dissolved in the working fluid is 40% by mass or less under conditions of a temperature of 80° C. and an absolute pressure of 2.8 MPa, and the refrigerating machine oil has a kinematic viscosity at −10° C. of 200 $mm^2/s$ or more and 3000 $mm^2/s$ or less.

The refrigerating machine oil may have a kinematic viscosity at −20° C. of 10000 $mm^2/s$ or less. The refrigerating machine oil may have a flash point of 250° C. or higher. The refrigerating machine oil may contain a phosphorus-containing antiwear agent. An amount of the refrigerant dissolved in the working fluid may be 15% by mass or less under conditions of a temperature of 40° C. and an absolute pressure of 0.7 MPa.

Another aspect of the present invention is a refrigerating machine containing a refrigerant circulation system containing a compressor, a condenser, an expansion mechanism, an evaporator, and an accumulator, wherein the refrigerant circulation system is filled with a working fluid containing a refrigerant and a refrigerating machine oil, the refrigerant contains a hydrocarbon refrigerant having 2 to 4 carbon atoms, the refrigerating machine oil has a mixed aniline point of 20° C. or higher and 50° C. or lower and a viscosity index of 110 or more, an amount of the refrigerant dissolved in the working fluid is 40% by mass or less under conditions of a temperature of 80° C. and an absolute pressure of 2.8 MPa, and the refrigerating machine oil has a kinematic viscosity at −10° C. of 200 $mm^2/s$ or more and 3000 $mm^2/s$ or less.

Another aspect of the present invention is a refrigerating machine oil filled in a refrigerant circulation system containing a compressor, a condenser, an expansion mechanism, an evaporator, and an accumulator, with a refrigerant, wherein the refrigerant contains a hydrocarbon refrigerant having 2 to 4 carbon atoms, the refrigerating machine oil has a mixed aniline point of 20° C. or higher and 50° C. or lower and a viscosity index of 110 or more, an amount of the refrigerant dissolved in the working fluid is 40% by mass or less under conditions of a temperature of 80° C. and an absolute pressure of 2.8 MPa, and the refrigerating machine oil has a kinematic viscosity at −10° C. of 200 $mm^2/s$ or more and 3000 $mm^2/s$ or less.

In each of the aspects described above, by using a refrigerating machine oil having the specific mixed aniline point (20° C. or higher and 50° C. or lower) and viscosity index (110 or more) in the presence of the hydrocarbon refrigerant, it is possible to maintain a refrigerant dissolved viscosity under high temperature and high pressure conditions as compared to the case of using a refrigerating machine oil having no such specific mixed aniline point and viscosity index. Although the amount of dissolved refrigerant at a temperature of 80° C. and the absolute pressure of 2.8 MPa and the kinematic viscosity of the refrigerating machine oil at −10° C. are not essential features for maintaining the refrigerant dissolved viscosity under high temperature and high pressure conditions, these features can give more favorable properties such as lubricity, low temperature fluidity, oil returnability, and the like.

Advantageous Effects of Invention

According to an aspect of the present disclosure, it is possible to maintain a refrigerant dissolved viscosity under high temperature and high pressure conditions.

BRIEF DESCRIPTION OF DRAWING

FIG. 1 is a schematic diagram illustrating one embodiment of a refrigerating machine.

DESCRIPTION OF EMBODIMENTS

Hereinafter, embodiments of the present invention will be described in detail with reference to the drawing as appropriate.

FIG. 1 is a schematic diagram illustrating one embodiment of a refrigerating machine. As shown in FIG. 1, a refrigerating machine 10 contains at least a refrigerant circulation system 6 in which a compressor (refrigerant compressor) 1, a condenser (gas cooler) 2, an expansion mechanism 3 (capillaries, expansion valves, etc.), and an evaporator (heat-exchanger) 4 are sequentially connected by a flow path 5. The refrigerant circulation system 6 also has an accumulator 7 between an evaporator 4 and a compressor 1 (on the side of the compressor 1) to inhibit and prevent the liquid refrigerant from flowing directly into the compressor 1.

In the refrigerant circulation system 6, first, high temperature (usually 70 to 120° C.) refrigerant discharged from the compressor 1 into the flow path 5 becomes a high density fluid (supercritical fluid or the like) by a condenser 2. Subsequently, the refrigerant is liquefied by passing through a narrow flow path of the expansion mechanism 3, and is further vaporized by the evaporator 4 to become a low temperature (usually −40 to 0° C.). The refrigerating machine 10 cooling uses a phenomenon in which heat is removed from the surroundings when refrigerant is vaporized in the evaporator 4.

In the compressor 1, a small amount of refrigerant and a large amount of refrigerating machine oil coexist under high temperature conditions (usually 70 to 120° C.). The refrigerant discharged from the compressor 1 into the flow path 5 is in a gaseous state and contains a small amount (usually 1 to 10% by volume) of the refrigerating machine oil as a mist, but the small amount of refrigerant is dissolved in the mist-like refrigerating machine oil (point "a" in FIG. 1).

In the condenser 2, the gaseous refrigerant is compressed to become a high-density fluid, and a large amount of refrigerant and a small amount of refrigerating machine oil coexist under a relatively high temperature condition (usually 40 to 80° C.) (point "b" in FIG. 1). Further, a mixture of a large amount of refrigerant and a small amount of refrigerating machine oil is sequentially sent to the expansion mechanism 3 and the evaporator 4 to rapidly become low temperature (usually −40 to 0° C.) (points "c" and "d" in FIG. 1), and is returned to the compressor 1 again.

When the compressor 1 has a high pressure, the liquid refrigerant may directly flow into the compressor 1. In order to suppress and prevent this, as described above, the accumulator 7 is disposed between the evaporator 4 and the compressor 1 (on the side of the compressor 1). In the lying state, a large amount of liquid refrigerant may exist in the compressor 1. In the starting state, the viscosity of the refrigerating machine oil may rapidly decrease to cause insufficient lubricating, and even when the liquid refrigerant is dissolved, an appropriate viscosity needs to be maintained.

Examples of such the refrigerating machine 10 include cooling devices in automobile air conditioners, dehumidifiers, refrigerators, freezing and refrigerating warehouses, vending machines, showcases, chemical plants and the like, residential air conditioners, package air conditioners, heat pumps for hot water supply, and the like.

The refrigerant circulation system 6 (the refrigerating machine is filled with a working fluid containing a refrigerant and a refrigerating machine oil. The refrigerant contains a hydrocarbon refrigerant having 2 to 4 carbon atoms. Examples of the hydrocarbon refrigerant having 2 to 4 carbon atoms contain any one or a mixture of two or more of ethylene, ethane, propane (R290), propylene, cyclopropane, normal butane, isobutane (R600a), cyclobutane, and methylcyclopropane. The hydrocarbon refrigerant having 2 to 4 carbon atoms is preferably propane (R290) or isobutane (R600a), and more preferably propane (R290).

The refrigerant may consist of a hydrocarbon refrigerant having 2 to 4 carbon atoms, or may further contain an additional refrigerant in addition to the hydrocarbon refrigerant having 2 to 4 carbon atoms. Examples of the additional refrigerants include any one or a mixture of two or more of saturated hydrofluorocarbon (HFC) refrigerants such as R32, R134a, R125, R143a, and R152a, unsaturated hydrofluorocarbon (HFO) refrigerants such as R1234yf and R1234ze, fluorine-containing ether refrigerants such as perfluoroether, bis (trifluoromethyl) sulfide refrigerants, trifluoroiodomethane refrigerants, and natural refrigerants such as ammonia (R717) and carbon dioxide (R744).

The content of the hydrocarbon refrigerant having 2 to 4 carbon atoms may be 50% by mass or more, 60% by mass or more, 70% by mass or more, 80% by mass or more, 90% by mass or more, or 95% by mass or more, based on the total amount of refrigerant.

The viscosity index of the refrigerating machine oil is 110 or more, and may be 140 or more, 150 or more, 160 or more, or 170 or more, and preferably 300 or less, and may be 250 or less, or 220 or less, from the viewpoint of more easily maintaining the refrigerant dissolved viscosity under high temperature and high pressure conditions. The viscosity index means a viscosity index measured in accordance with JIS K2283:2000.

The mixed aniline point of the refrigerating machine oil is 20° C. or higher and 50° C. or lower, and may be 25° C. or higher or 30° C. or higher, or may be 45° C. or lower or 40° C. or lower, from the viewpoint of further easily maintaining the refrigerant dissolved viscosity under high temperature and high pressure conditions. The mixed aniline point means a mixed aniline point defined in JIS K2256:2013 "Petroleum products-Determination of aniline point and mixed aniline point". The refrigerating machine oil having the mixed aniline point within the above range exhibits characteristics intermediate to those of polyolester-based refrigerating machine oils and hydrocarbon-based refrigerating machine oils that are generally used as the refrigerating machine oil, and exhibits unique characteristics that the amount of refrigerant dissolved in a hydrocarbon refrigerant having 2 to 4 carbon atoms such as R290 can be suppressed and the refrigerant dissolved viscosity at high temperature and high pressure such as 80° C. and 2.8 MPa can be maintained more than those of any of the above. In addition, the two layer separation temperature with a hydrocarbon refrigerant having 2 to 4 carbon atoms such as R290 (for example, the mass ratio of the refrigerating machine oil to the refrigerant in the working fluid (refrigerating machine oil/refrigerant) is 1/9 to 9/1) tends to be lower than −70° C. and too much compatible when a polyolester-based refrigerating machine oil or hydrocarbon-based refrigerating machine oil generally used as the refrigerating machine oil is used. In contrast, when a refrigerating machine oil having the mixed aniline point within the above range is used, the two layer separation temperature can be −70° C. or higher, −60° C. or higher, or −50° C. or higher.

The refrigerating machine oil has the specific kinematic viscosity at low temperature. The kinematic viscosity at −10° C. of the refrigerating machine oil is 200 mm$^2$/s or more, preferably 250 mm$^2$/s or more, more preferably 300 mm$^2$/s or more, and even more preferably 400 mm$^2$/s or more. The kinematic viscosity at −10° C. of the refrigerating machine oil is 3000 mm$^2$/s or less, preferably 2500 mm$^2$/s or less, more preferably 2000 mm$^2$/s or less, still more preferably 1500 mm$^2$/s or less, and particularly preferably 1000 mm$^2$/s or less. The kinematic viscosity means kinematic viscosity measured in accordance with JIS K2283:2000 (the same applies hereinafter). When the refrigerating machine oil has the kinematic viscosity at −10° C. within the above range, the refrigerating machine oil exhibits particularly excellent low-temperature fluidity while maintaining a necessary lubricating viscosity, even when the refrigerating machine oil is used alone or when the refrigerant is dissolved, and the oil returnability of an evaporator or the like becomes good, thereby improving the heat exchange efficiency.

For the same reason as described above, the kinematic viscosity at −20° C. of the refrigerating machine oil is preferably 10000 mm$^2$/s or less, more preferably 7000 mm$^2$/s or less, even more preferably 3000 mm$^2$/s or less, and particularly preferably 2500 mm$^2$/s or less, and is preferably 200 mm$^2$/s or more, more preferably 500 mm$^2$/s or more, and even more preferably 1000 mm$^2$/s or more.

The kinematic viscosity at 40° C. of the refrigerating machine oil is preferably 2 mm$^2$/s or more, may be 20 mm$^2$/s or more, 30 mm$^2$/s or more, or 40 mm$^2$/s or more, and is preferably 400 mm$^2$/s or less, may be 250 mm$^2$/s or less, 150 mm$^2$/s or less, 100 mm$^2$/s or less, or 60 mm$^2$/s or less.

The kinematic viscosity at 100° C. of the refrigerating machine oil is not particularly limited as long as the kinematic viscosity at −10° C. satisfies the above, but is preferably 4 mm$^2$/s or more, may be 6 mm$^2$/s or more, 8 mm$^2$/s or more, or 9 mm$^2$/s or more, and is preferably 40 mm$^2$/s or less, may be 25 mm$^2$/s or less, 15 mm$^2$/s or less, 12 mm$^2$/s or less, or 10 mm$^2$/s or less.

The flash point of the refrigerating machine oil is preferably 250° C. or higher, more preferably 270° C. or higher, and even more preferably 290° C. or higher, and may be 350° C. or lower, from the viewpoint of being able to increase safety even under the premise of using a highly flammable refrigerant. The flash point means a flash point measured in accordance with JIS K2265-4:2007 (Cleveland open (COC) method).

The pour point of the refrigerating machine oil may be preferably −10° C. or lower, more preferably −20° C. or lower. The pour points refer to pour points measured in accordance with JIS K2269:1987.

The refrigerating machine oil contains lubricating base oil and, if necessary, an additive. The lubricating base oil is appropriately selected so that the refrigerating machine oil has the above-described characteristics and that a working fluid has the below-described characteristics.

The lubricating base oil may be, for example, a hydrocarbon oil or an oxygen-containing oil. Examples of the hydrocarbon oil include mineral oils, olefin polymers, naphthalene compounds, and alkylbenzenes. Examples of the oxygen-containing oil include esters such as monoesters (esters of monoalcohols), polyol esters (esters of polyols having two or more hydroxyl groups), and complex esters; and ethers such as polyalkylene glycols, polyvinyl ethers, polyphenyl ethers, and perfluoroethers.

The lubricating base oil is preferably at least one selected from esters, polyalkylene glycols and polyvinyl ethers, or at least one selected from polyolesters, complex esters and polyalkylene glycols, more preferably at least one selected from polyolesters and complex esters, and particularly preferably a mixture of two or more polyolesters, from the viewpoint of particularly suitably obtaining a refrigerating machine oil having the above-mentioned characteristics and a working fluid having the below-mentioned characteristics.

The mixture of two or more polyol esters contains, for example, two or more polyol esters of one or more polyhydric alcohols selected from neopentyl glycol, trimethylolpropane, and pentaerythritol and one or more fatty acids selected from fatty acids having 14 to 18 carbon atoms. The fatty acid is particularly preferably a fatty acid containing an unsaturated fatty acid as a main component, and the unsaturated fatty acid is preferably one or two or more unsaturated fatty acids selected from oleic acid, palmitoleic acid, linoleic acid, and linolenic acid.

The fatty acid having 14 to 18 carbon atoms constituting the polyol ester (mixture) may contain a saturated fatty acid. The ratio of the unsaturated fatty acid in the fatty acid having 14 to 18 carbon atoms is preferably 70% by mass or more, may be 75% by mass or more, 80% by mass or more, or 84% by mass or more, and may be 100% by mass or less, 98% by mass or less, or 96% by mass or less. The ratio of the saturated fatty acid in the fatty acid having 14 to 18 carbon atoms is preferably 0% by mass or more, may be 2% by mass or more or 4% by mass or more, and may be 30% by mass or less, 25% by mass or less, 20% by mass or less, or 16% by mass or less.

These polyol esters may be polyol esters obtained by using a plurality of polyhydric alcohols or fatty acids as raw materials, or may be a mixture of two or more polyol esters obtained from one kind of polyhydric alcohol and one kind of fatty acid. The polyol ester may be a partial ester in which a part of two or more hydroxyl groups in the polyol is esterified, or may be a complete ester in which all of the hydroxyl groups are esterified. The mixture may contain two or more partial esters, may contain two or more complete esters, or may contain one or more partial esters and one or more complete esters.

The content of the lubricating base oil may be 80% by mass or more, 90% by mass or more, or 95% by mass or more, based on the total amount of the refrigerating machine oil.

Examples of the additives include acid scavengers such as epoxy compounds and carbodiimide compounds, antioxidants such as phenol compounds and amine compounds, phosphorus-containing antiwear agents such as phosphorus compounds and sulfur compounds, oiliness agents such as ester compounds, antifoaming agents such as silicone compounds, metal deactivators such as benzotriazole compounds, and viscosity index improvers such as poly (meth) acrylate compounds. The content of the additive may be preferably 0.1% by mass or more, more preferably 0.5% by mass or more, and may be 5% by mass or less or 2% by mass or less, based on the total amount of the refrigerating machine oil.

The refrigerating machine oil preferably contains a phosphorus-containing antiwear agent from the viewpoint of high responsiveness of antiwear properties. Examples of the phosphorus-containing antiwear agent include orthophosphoric acid esters such as tricresyl phosphate, triphenyl phosphate, trialkyl phosphate, and tri (alkylphenyl) phosphate; and thiophosphoric acid esters such as phosphorous acid ester and triphenyl phosphorothionate. The content of the phosphorus-containing antiwear agent may be preferably 0.1% by mass or more, more preferably by mass or more, and may be 5% by mass or less or 2% by mass or less, based on the total amount of the refrigerating machine oil.

The content of the refrigerating machine oil in the working fluid may be 1 part by mass or more or 2 parts by mass or more, and may be 500 parts by mass or less or 400 parts by mass or less, with respect to 100 parts by mass of the refrigerant.

The working fluid is a working fluid having an amount of the dissolved refrigerant of 40% by mass or less under conditions of a temperature of 80° C. and an absolute pressure of 2.8 MPa. The amount of dissolved refrigerant is preferably 35% by mass or less, 32% by mass or less, or 30% by mass or less. Under conditions of a temperature of 80° C. and an absolute pressure of 2.8 MPa, the lower limit of the amount of refrigerant dissolved in the working fluid is not particularly limited as long as there is a certain amount of dissolved refrigerant, but is preferably 5% by mass or more, more preferably 15% by mass or more, even more preferably 20% by mass or more, and particularly preferably 25% by mass or more. When R290 is used as the refrigerant, the amount of the refrigerant dissolved under these conditions is preferably within the above range, and particularly when the amount of the refrigerant dissolved under these conditions is 20% by mass or more and 35% by mass or less, compatibility with the refrigerant and the viscosity of the refrigerant dissolved can be maintained in good balance.

Under conditions of a temperature of 40° C. and an absolute pressure of 0.7 MPa, the amount of refrigerant dissolved in the working fluid is preferably 20% by mass or less, more preferably 15% by mass or less, and preferably 5% by mass or more. When R290 is used as the refrigerant, the amount of dissolved refrigerant under these conditions is preferably within the above range, and when the amount of dissolved refrigerant is 5% by mass or more and 15% by mass or less under such relatively mild conditions as compared to the more severe conditions of a temperature of 80° C. and 2.8 MPa described above, compatibility with the refrigerant and the viscosity of dissolved refrigerant can be maintained in good balance.

The amount of the refrigerant dissolved in the working fluid S (% by mass) is represented by refrigerant amount (g)/(refrigerant amount (g)+refrigerating machine oil amount (g)) in the working fluid×100, and is measured according to the following procedure.

First, a pressure-resistant vessel (for example, a volume of 200 to 500 cm$^3$) equipped with a vibrating or rotating viscometer, a thermometer, and a manometer is filled with a refrigerating machine oil, the pressure-resistant vessel is vacuum-degassed, and then filled with a refrigerant. The temperature of the working fluid and the pressure in the pressure-resistant vessel are adjusted so that the temperature is 80° C. and the absolute pressure is 2.8 MPa or 40° C. and 0.7 MPa. The amount of the dissolved refrigerant S (% by mass) is calculated by the following formula from the filling amounts of the refrigerating machine oil and the refrigerant at this time, the volume of the refrigerant vapor portion in the pressure vessel, and the refrigerant vapor density.

$$S=(Rf-Vv\times Dv)\times 100/((Rf-Vv\times Dv)+Of)$$

S: amount of refrigerant dissolved in working fluid (% by mass)

Rf: amount of refrigerant filled in a pressure-resistant vessel (g)

Vv: volume of refrigerant vapor portion in pressure vessel (cm$^3$) (=volume of pressure vessel V−volume of working fluid Vmix)

Dv: refrigerant vapor density (g/cm$^3$)

Of: amount of refrigerating machine oil filled in pressure-resistant vessel (g)

The working fluid can maintain a refrigerant dissolved viscosity under high temperature and high pressure conditions by containing the above-described specific refrigerating machine oil. In particular, the refrigerant dissolved viscosity of the working fluid under conditions of a temperature of 80° C. and an absolute pressure of 2.8 MPa may be, for example, 1.0 mm$^2$/s or more, preferably 1.2 mm$^2$/s or more, and more preferably 1.5 mm$^2$/s or more. From the viewpoint of balance with refrigerant compatibility, the refrigerant dissolved viscosity may be preferably 5.0 mm$^2$/s or less, more preferably 4 0 mm$^2$/s or less, and still more preferably 3.0 mm$^2$/s or less. When, for example, R290 is used as the refrigerant, it is particularly preferable that the refrigerant dissolved viscosity of the working fluid falls within the above range.

The refrigerant dissolved viscosity of the working fluid under conditions of a temperature of 40° C. and an absolute pressure of 0.7 MPa may be preferably 4.0 mm$^2$/s or more, more preferably 5 0 mm$^2$/s or more, 8 mm$^2$/s or more, or 12 mm$^2$/s or more, and may be preferably 30 mm$^2$/s or less, 25 mm$^2$/s or less, or 20 mm$^2$/s or less, in view of balance with refrigerant compatibility. When, for example, R290 is used as the refrigerant, it is particularly preferable that the refrigerant dissolved viscosity of the working fluid falls within the above range.

The refrigerant dissolved viscosity (mm$^2$/s) of the working fluid is measured according to the following procedure.

The absolute viscosity (mPa·s) of the working fluid is measured using a vibrating or rotating viscometer under the conditions described in the method for measuring the amount of dissolved refrigerant S. The refrigerant dissolved viscosity R-Vis (mm$^2$/s) of the working fluid is determined as P/Dw obtained by dividing the measured absolute viscosity P (mPa·s) by the working fluid density Dw (g/cm$^3$). Here, the working fluid density Dw (g/cm$^3$) is calculated by the following equation.

$$Dw=(Rf-Vv\times Dv+Of)/Vmix$$

Dw: working fluid density (g/cm$^3$)

Rf: amount of refrigerant filled in pressure-resistant vessel (g)

Vv: refrigerant vapor volume (cm$^3$) occupied in pressure vessel

Dv: refrigerant vapor density (g/cm$^3$).

Of: amount of refrigerating machine oil filled in pressure-resistant vessel (g)

Vmix: working fluid volume (cm³)

The kinematic viscosity at −20° C. of the working fluid is preferably 1000 mm²/s or less, more preferably 700 mm²/s or less, even more preferably 300 mm²/s or less, and particularly preferably 200 mm²/s or less, and is preferably 20 mm²/s or more, 50 mm²/s or more, and even more preferably 100 mm²/s or more.

The kinematic viscosity at −10° C. of the working fluid is preferably 20 mm²/s or more, more preferably 30 mm²/s or more, and even more preferably 40 mm²/s or more, and is preferably 300 mm²/s or less, more preferably 250 mm²/s or less, even more preferably 200 mm²/s or less, particularly preferably 150 mm²/s or less, and most preferably 100 mm²/s or less.

The low-temperature-side two layer separation temperature of the working fluid preferably has at least a compatible region when the mass ratio of the refrigerating machine oil to the refrigerant in the working fluid (refrigerating machine oil/refrigerant) is 1/9 to 9/1. Specifically, the low-temperature-side two layer separation temperature of the working fluid preferably has a compatible region of −10° C. or lower, more preferably −20° C. or lower, even more preferably −30° C. or lower, and particularly preferably −40° C. or lower. In addition, when the refrigerant and the refrigerating machine oil are excessively dissolved, the refrigerant dissolved viscosity tends to be low. Therefore, the working fluid preferably has a compatible region in which the low-temperature side two layer separation temperature is preferably −70° C. or more, more preferably −60° C. or more, and even more preferably −50° C. or more. The low-temperature side two layer separation temperature of the working fluid may be −10° C. or lower, −20° C. or lower, −30° C. or lower, or −40° C. or lower, and −70° C. or higher, −60° C. or higher, or −50° C. or higher, particularly when the mass ratio of the refrigerating machine oil to the refrigerant (refrigerating machine oil/refrigerant) in the working fluid is 1/9 to 4/6. The low-temperature side two layer separation temperature of the working fluid may be −10° C. or lower, −20° C. or lower, −30° C. or lower, or −40° C. or lower, and −70° C. or higher, −60° C. or higher, or -50° C. or higher when the mass ratio of the refrigerating machine oil to the refrigerant (refrigerating machine oil/refrigerant) in the working fluid is 6/4 to 9/1, particularly 6/4 to 7/3.

In the refrigerating machine 10 and working fluid described above, by using a refrigerating machine oil having the specific mixed aniline point (20° C. or higher and 50° C. or lower) and a viscosity index (110 or more) under the presence of a hydrocarbon refrigerant, it is possible to maintain a refrigerant melt viscosity under high temperature and high pressure conditions compared to the case of using a refrigerating machine oil not having such a specific mixed aniline point and viscosity index. In addition, in one embodiment, it is possible to maintain lubricity of sliding parts such as bearings by maintaining sufficient viscosity characteristics, improve fluidity at low temperatures, secure oil returnability from an evaporator or an accumulator, and enhance reliability and efficiency of a refrigerating machine.

EXAMPLES

Hereinafter, the present invention will be described in more detail based on examples, but the present invention is not limited to the examples.

Example 1

A refrigerating machine oil of Example 1 was prepared by mixing a mixed ester A of a monoester and a diester of neopentyl glycol and a fatty acid having 14 to 18 carbon atoms with a mixed ester B of a triester and a tetraester of pentaerythritol and a fatty acid having 14 to 18 carbon atoms at a mass ratio of 3/7 (=mixed ester A/mixed ester B). The fatty acid having 14 to 18 carbon atoms constituting the polyol ester (mixture) contains unsaturated fatty acid (containing unsaturated fatty acid having 16 carbon atoms and unsaturated fatty acid having 18 carbon atoms as main components) and saturated fatty acid (containing saturated fatty acid having 14 carbon atoms, saturated fatty acid having 16 carbon atoms, and saturated fatty acid having 18 carbon atoms as main components) at a mass ratio of 94/6 (=unsaturated fatty acid/saturated fatty acid).

Example 2

A refrigerating machine oil of Example 2 was prepared by mixing a mixed ester of diesters and triesters of trimethylolpropane and fatty acids having 14 to 18 carbon atoms with a tetraester of pentaerithritol and branched saturated acids having 18 carbon atoms at a mass ratio of 9/1 (=mixed ester 2A/tetraester 2B). The fatty acid having 14 to 18 carbon atoms constituting the polyol ester (mixture) contains unsaturated fatty acid (containing unsaturated fatty acid having 16 carbon atoms and unsaturated fatty acid having 18 carbon atoms as main components) and saturated fatty acid (containing saturated fatty acid having 14 carbon atoms, saturated fatty acid having 16 carbon atoms, and saturated fatty acid having 18 carbon atoms as main components) at a mass ratio of 85/15 (=unsaturated fatty acid/saturated fatty acid).

Example 3

A refrigerating machine oil of Example 3 was prepared by mixing a complex ester of neopentyl glycol/1,4-butanediol/3,5,5-trimethylhexanol/adipic acid (=1/0.3/2.5/2.4 (molar ratio)) with a mixed ester of a monoester and a diester of neopentyl glycol and a fatty acid having 14 to 18 carbon atoms at a mass ratio of 7/3 (=complex ester/mixed ester). The fatty acid having 14 to 18 carbon atoms contains unsaturated fatty acid (containing unsaturated fatty acid having 16 carbon atoms and unsaturated fatty acid having 18 carbon atoms as main components) and saturated fatty acid (containing saturated fatty acid having 14 carbon atoms, saturated fatty acid having 16 carbon atoms, and saturated fatty acid having 18 carbon atoms as main components) at a mass ratio of 94/6 (=unsaturated fatty acid/saturated fatty acid).

Comparative Example 1

A refrigerating machine oil of Comparative Example 1 was prepared using a tetraester of pentaerythritol and 2-ethylhexanoic acid/3,5,5-trimethylhexanoic acid (=1/1 (molar ratio)).

Comparative Example 2

A refrigerating machine oil of Comparative Example 1 was prepared using a paraffinic highly refined mineral oil.

The characteristics of each of the prepared refrigerating machine oils are shown in Table 1. Table 1 shows the two phase separation temperature for each oil/refrigerant ratio (mass ratio), the kinematic viscosity at each of −10° C. and −20° C., the amount of refrigerant dissolved in the working fluid at 80° C. and 2.8 MPa absolute, and the viscosity of refrigerant dissolved at 80° C. and 2.8 MPa absolute for working fluids using each refrigerating machine oil and propane (R290) as the refrigerant. The kinematic viscosity at each of −10° C. and −20° C. of the working fluid is a calculated value on the assumption that the kinematic viscosity of the refrigerating machine oil itself is reduced by 90%.

TABLE 1

|  |  | Example | | | Comparative Example | |
|---|---|---|---|---|---|---|
|  |  | 1 | 2 | 3 | 1 | 2 |
| Characteristics of refrigerating machine oils |  |  |  |  |  |  |
| Mixed aniline point (° C.) |  | 42 | 39 | 27 | 16 | 78 |
| Kinematic viscosity at 40° C. ($mm^2/s$) |  | 48.1 | 52.8 | 46.81 | 68.4 | 9.94 |
| Kinematic viscosity at 100° C. ($mm^2/s$) |  | 9.8 | 10.1 | 8.683 | 8.4 | 2.53 |
| Viscosity index |  | 196 | 183 | 166 | 90 | 72 |
| Kinematic viscosity at −10° C. ($mm^2/s$) |  | 700 | 830 | 958 | 3400 | 115 |
| Kinematic viscosity at −20° C. ($mm^2/s$) |  | 2250 | 1850 | 2542 | 12500 | 225 |
| Characteristics of working fluid |  |  |  |  |  |  |
| Two layer separation temperature (° C.) | Oil/refrigerant ratio |  |  |  |  |  |
|  | 1/9 | −34 | −43 | >25 | <−70 | <−70 |
|  | 3/7 | −29 | −39 | >25 | <−70 | <−70 |
|  | 4/6 | — | — | 8 | — | — |
|  | 5/5 | — | — | −15 | — | — |
|  | 6/4 | — | — | −38 | — | — |
|  | 7/3 | — | — | — | — | — |
| Kinematic viscosity at −10° C. |  | 70 | 83 | 96 | 340 | 12 |
| Kinematic viscosity at −20° C. |  | 225 | 185 | 254 | 1250 | 25 |
| Amount of dissolved refrigerant (% by mass) |  | 29 | 27 | 25 | 33 | 58 |
| Refrigerant dissolved viscosity ($mm^2/s$) |  | 1.7 | 1.8 | 1.9 | 0.7 | <0.5 |

REFERENCE SIGNS LIST

1: compressor, 2: condenser, 3: expansion mechanism, 4: evaporator, 5: flow path, 6: refrigerant circulation system, 7: accumulator, 10: refrigerating machine.

The invention claimed is:

1. A working fluid filled in a refrigerant circulation system comprising a compressor, a condenser, an expansion mechanism, an evaporator, and an accumulator, the working fluid comprising:
a refrigerant; and
a refrigerating machine oil,
wherein the refrigerant consists of a hydrocarbon refrigerant having 2 to 4 carbon atoms,
the refrigerating machine oil has a mixed aniline point of 20° C. or higher and 50° C. or lower and a viscosity index of 140 or more,
an amount of the refrigerant dissolved in the working fluid is 40% by mass or less under conditions of a temperature of 80° C. and an absolute pressure of 2.8 MPa,
the refrigerating machine oil has a kinematic viscosity at −10° C. of 200 $mm^2/s$ or more and 3000 $mm^2/s$ or less, and
refrigerating machine oil has a flash point of 250° C. or higher.

2. The working fluid according to claim 1, wherein the refrigerating machine oil has a kinematic viscosity at −20° C. of 10000 $mm^2/s$ or less.

3. The working fluid according to claim 1, wherein the refrigerating machine oil comprises a phosphorus-containing antiwear agent.

4. The working fluid according to claim 1, wherein an amount of the refrigerant dissolved in the working fluid is 15% by mass or less under conditions of a temperature of 40° C. and an absolute pressure of 0.7 MPa.

5. A refrigerating machine comprising a refrigerant circulation system comprising a compressor, a condenser, an expansion mechanism, an evaporator, and an accumulator,
wherein the refrigerant circulation system is filled with a working fluid comprising a refrigerant and a refrigerating machine oil,
the refrigerant consists of a hydrocarbon refrigerant having 2 to 4 carbon atoms,
the refrigerating machine oil has a mixed aniline point of 20° C. or higher and 50° C. or lower and a viscosity index of 140 or more,
an amount of the refrigerant dissolved in the working fluid is 40% by mass or less under conditions of a temperature of 80° C. and an absolute pressure of 2.8 MPa,
the refrigerating machine oil has a kinematic viscosity at −10° C. of 200 $mm^2/s$ or more and 3000 $mm^2/s$ or less, and
refrigerating machine oil has a flash point of 250° C. or higher.

6. A refrigerating machine oil filled in a refrigerant circulation system comprising a compressor, a condenser, an expansion mechanism, an evaporator, and an accumulator, with a refrigerant, wherein the refrigerant comprises a hydrocarbon refrigerant having 2 to 4 carbon atoms, the refrigerating machine oil has a mixed aniline point of 20° C. or higher and 50° C. or lower and a viscosity index of 140 or more, an amount of the refrigerant dissolved in the working fluid is 40% by mass or less under conditions of a temperature of 80° C. and an absolute pressure of 2.8 MPa, the refrigerating machine oil has a kinematic viscosity at −10° C. of 200 mm$^2$/s or more and 3000 mm$^2$/s or less, the refrigerating machine oil comprises no mineral oil, and refrigerating machine oil has a flash point of 250° C. or higher.

7. The working fluid according to claim 1, wherein the refrigerating machine oil comprises no mineral oil.

8. The refrigerating machine according to claim 5, wherein the refrigerating machine oil comprises no mineral oil.

* * * * *